June 28, 1960  W. RODENACKER  2,942,656
FILM EVAPORATOR

Filed Nov. 28, 1956  5 Sheets-Sheet 1

SECTION a-b

SECTION c-d

INVENTOR.
WOLF RODENACKER

ATTORNEYS

June 28, 1960 W. RODENACKER 2,942,656
FILM EVAPORATOR

Filed Nov. 28, 1956 5 Sheets-Sheet 2

SECTION g-h

INVENTOR.
WOLF RODENACKER
BY Burgess, Dinklage & Sprung

ATTORNEYS

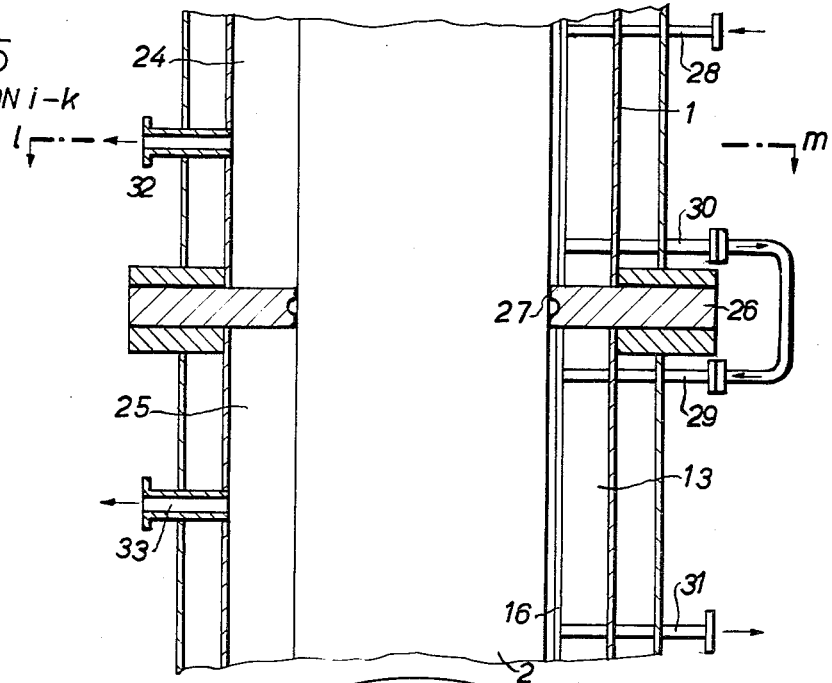
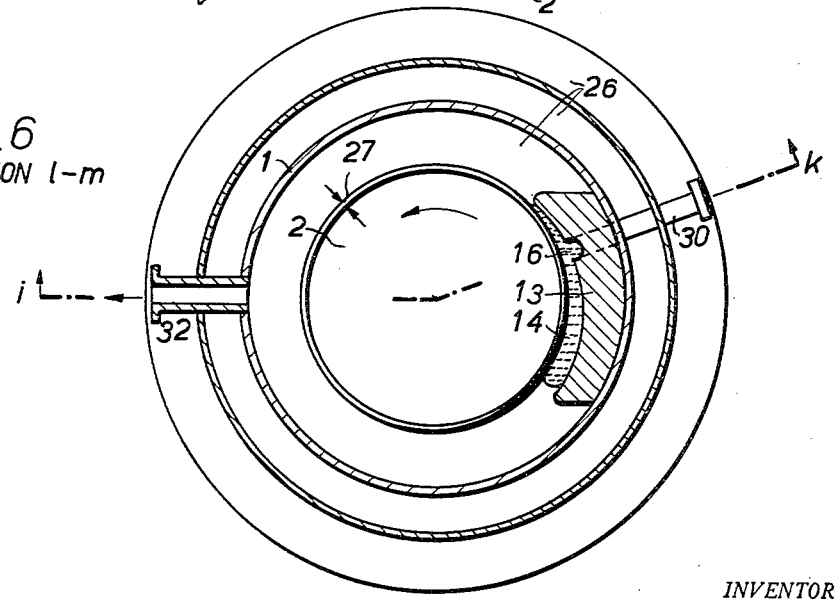

United States Patent Office 2,942,656
Patented June 28, 1960

2,942,656

FILM EVAPORATOR

Wolf Rodenacker, Dormagen, Germany, assignor to Farbenfabriken Bayer Aktiengesellschaft, Leverkusen, Germany, a corporation of Germany Filed Nov. 28, 1956, Ser. No. 624,925

8 Claims. (Cl. 159—12)

This invention relates to a film evaporator for liquids, comprising a roller which is rotatable inside an evaporator chamber and can be wetted by the liquid, the roller serving as evaporation surface.

The invention has for an object to ensure the uniform wetting of the roller surface of such an evaporator to cause an intense movement of all particles of liquid guided through the evaporator chamber, and to ensure that all particles of liquid remain in the chamber for an equal time. It is essential that these conditions are maintained, especially when treating many viscous liquids (for example spinning melts), since any parts of such liquids which are deposited at dead zones within the evaporator chamber are decomposed owing to their sensitivity to oxygen and to the influence of temperature, with consequent danger to the purity of the final product. The use of mechanical stirrers or the like does not obviate this danger, since liquid particles are deposited on such stirrers which are then no longer able to participate in the smooth flow of liquid through the evaporator chamber.

It has now been found that these difficulties can be overcome if, in accordance with the present invention, the roller co-operates with an element arranged in the evaporation chamber to form a wedge-shaped slot-like space into which liquid can be supplied under pressure and from which liquid can be discharged due to the pressure therein. At least one open channel can be arranged in the element axially of the roller and facing into the wedge-shaped space, this channel being connected to supply and discharge pipes for the liquid.

With such an evaporator, the roller can be uniformly wetted with liquid lengthwise and all surfaces which are wetted are also rinsed, so that no static liquid zones are formed inside the chamber. Owing to the fact that the liquid is positively guided through the chamber, all particles of liquid remain in the chamber for the same length of time. Furthermore, a good intermixing of the liquid is obtained without the assistance of mechanical stirrer arms or the like.

Figure 1:
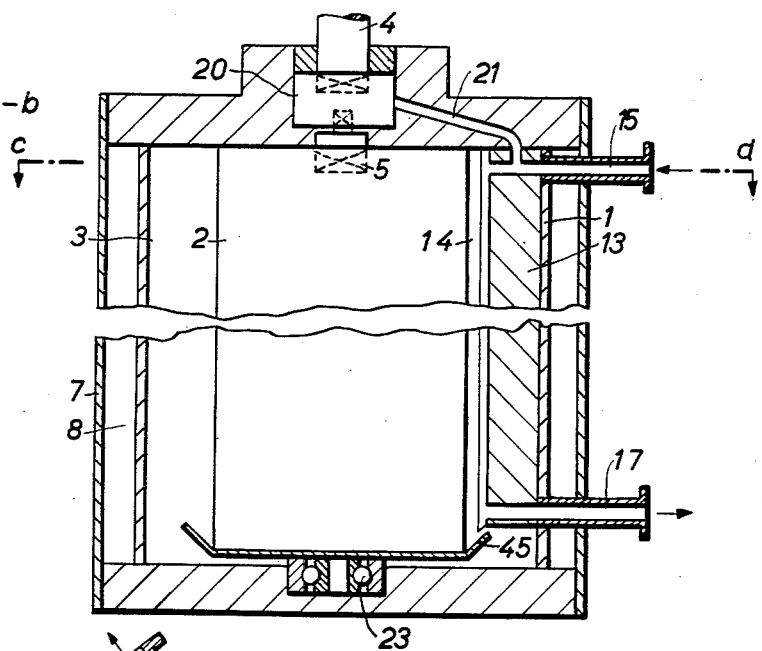
Figure 3:
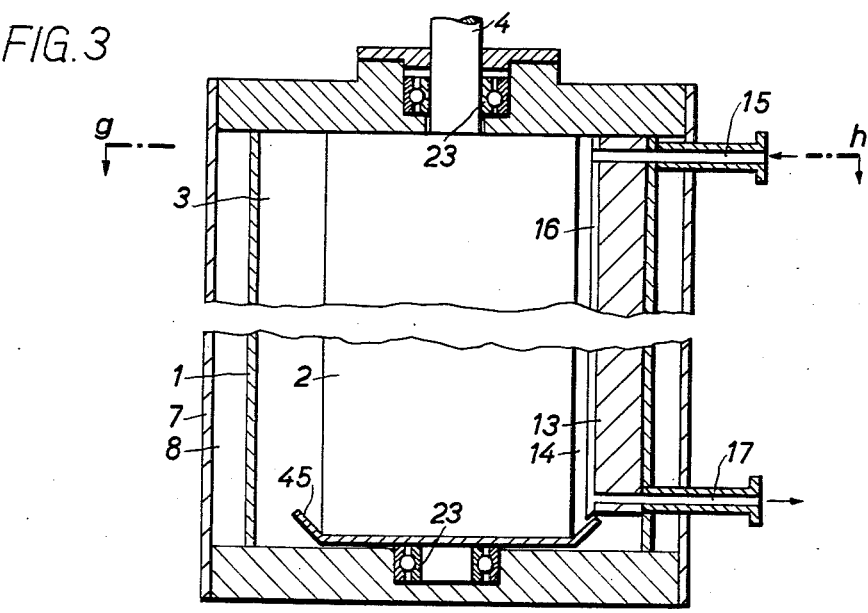
Figure 4:
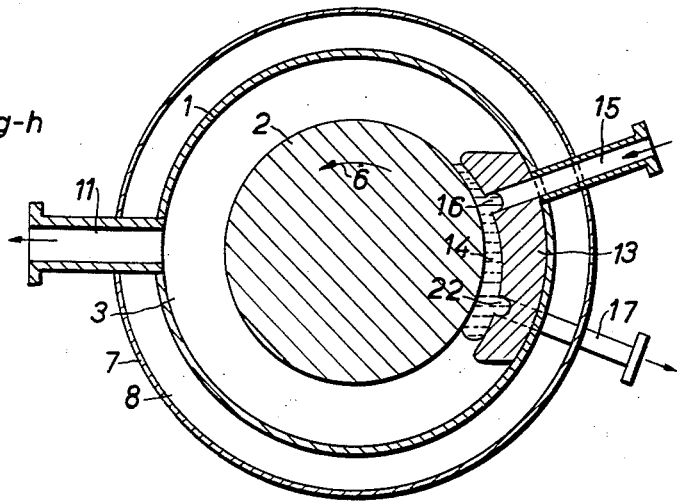
Figure 7:
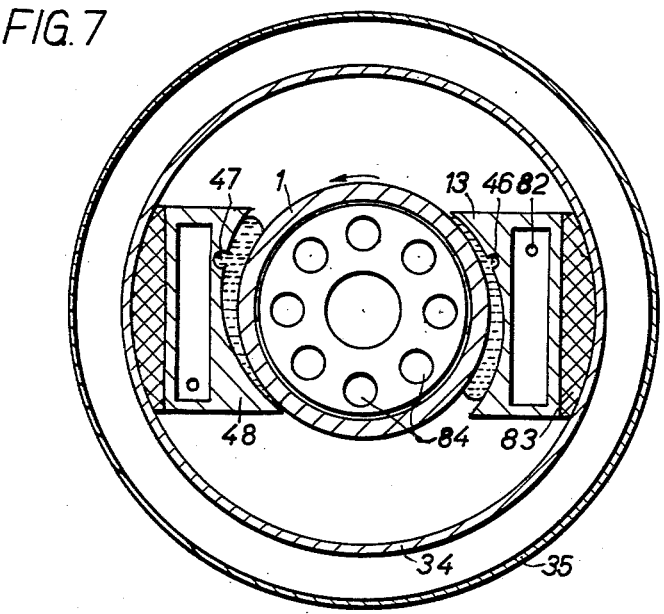
Figure 8:
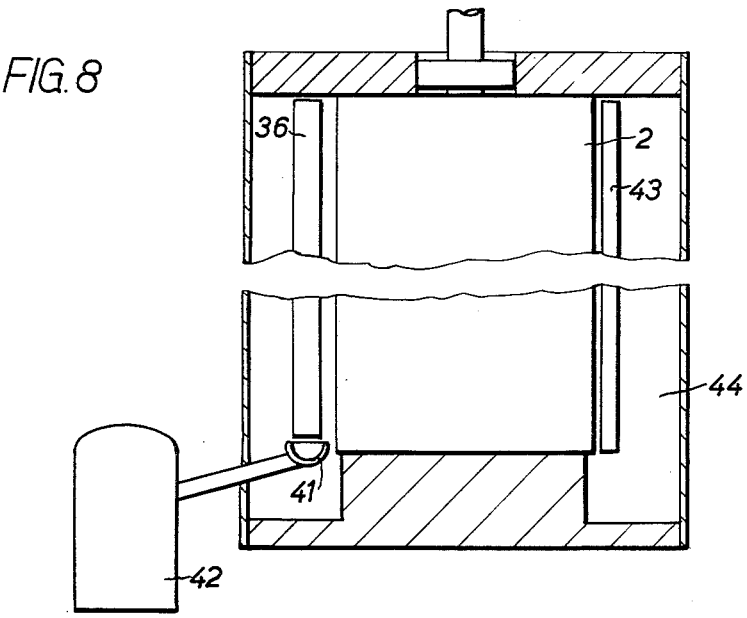
Figure 9:
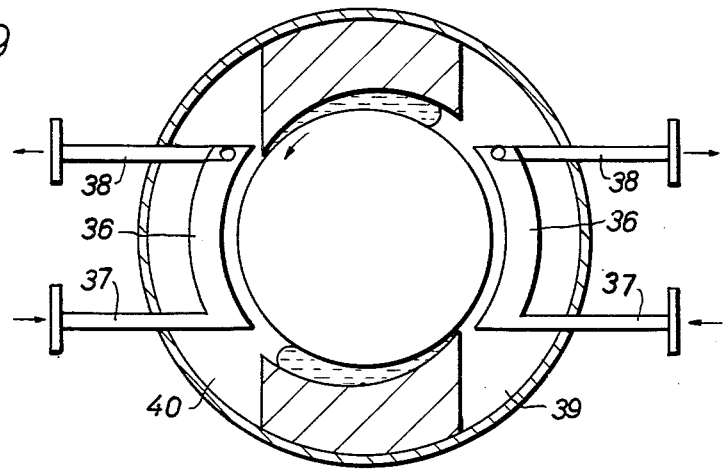

Some embodiments of the invention are shown diagrammatically in the accompanying drawings of which:
Figure 1 is a vertical section and
Figure 2 is a cross-section through a film evaporator apparatus,
Figures 3 and 4 are similar views of a modification,
Figures 5 and 6 are similar views of another modification,
Figure 7 is a cross-section of yet another modification, while
Figures 8 and 9 are sectional views of another modification.

Figure 2:
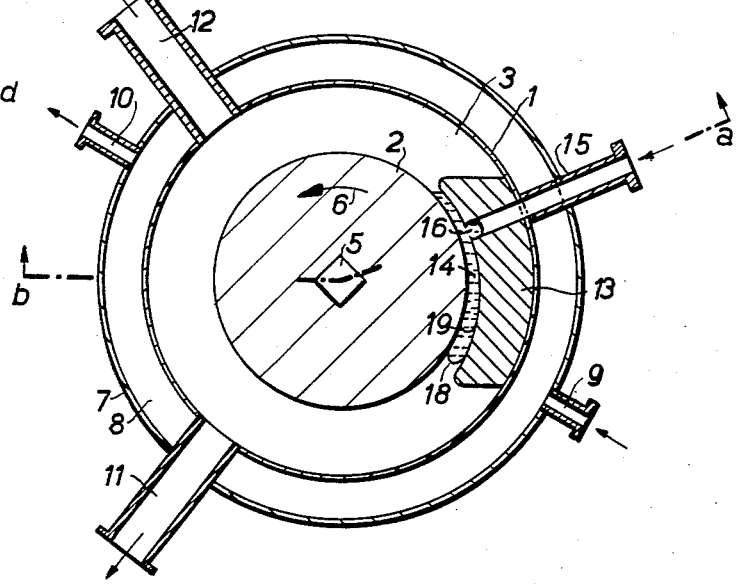

The evaporator illustrated in Figures 1 and 2 comprises a cylindrical housing 1 and a roller 2, which serves as an evaporator surface and can be set in rotation about its vertical axis and in the direction of the arrow 6 by means of a shaft 4 and a square end 5 inside an evaporator chamber 3 formed inside the housing 1. The housing 1 has a jacket 7 and a heating or cooling medium can be introduced into the space 8 formed between the housing 1 and the jacket 7 through a pipe connection 9 and can be discharged from the space 8 through a pipe connection 10. Vacuum can be applied through pipe connections 11 and 12. Arranged inside the housing 1 is an element 13 which co-operates with the roller 2 to define a wedge-shaped space 14. A pipe 15 serves for the introduction of liquid into a channel 16 in the element 13 and a pipe 17 serves for the discharge of the liquid from channel 16.

Liquid supplied through the pipe 15 to the channel 16 flows into the wedge-shaped space 14 and fills the latter to a filling limit 18 when the roller 2 is revolving at a predetermined speed. As is known from the bearings used in general machine construction, pressures are set up along the periphery of the roller in the wedge-shaped space 14 and the value of these pressures increases from the filling limit 18, first slowly and then quickly up to a maximum, and falls again to the initial value at the other end of the space 14. The channel 16 is arranged in the element 13 at that part of the wedge-shaped space 14 at which the maximum pressure obtains; it can, of course, also be arranged at any other position in the space 14. The supply of the liquid through the pipe 15 must therefore be effected by means of a pressure pump (not shown), which is so constructed that it operates only up to the predetermined maximum pressure and does not deliver any more liquid beyond this pressure. This can be achieved by providing the pump with a by-pass pipe having a throttle. Consequently, if the pressure in the channel 16 corresponds to the maximum delivery pressure of the pump, no more liquid penetrates into the wedge-shaped slot 14. However, if liquid is withdrawn from the space 16 through the pipe 17, for example by means of a gearwheel pump (not shown), the filling limit 18 of the space 14 returns to the filling limit 19 and the pressures in the space 14 simultaneously drop. The feed pump is then once again in the position to deliver liquid through the pipe 15 into the space 14.

The distribution of pressure in the wedge-shaped space 14 is dependent on the arcuate length and the width of the space, the angular velocity of the roller 2 and the viscosity of the liquid. These values can be combined to form a characteristic value without dimensions:

$$\frac{p}{\eta.\omega} = \frac{\text{Pressure}}{\text{Viscosity} \times \text{angular velocity}}$$

as is already known from experiments. The characteristic number was established at 15000 with a slot width of 0.2 mm, and a roller diameter of 100 mm. The rotating roller 2 entrains liquid from the wedge-shaped space 14 in a thin layer and conducts it through the evaporator chamber 3.

A second element (not shown), similar to element 13, can be arranged on the wall of the housing 1 facing the element 13, so as to form a second wedge-shaped space. The vapours pass, for example, into a condenser (not shown) through the vacuum pipes 11 and 12.

The vertical roller 2 has at its bottom end a dish 45 for collecting liquid which may run down when the roller is stopped. When rotation of the roller is resumed, the liquid is removed from the dish 45 by way of the pipe 17 owing to the pumping action of the wedge-shaped slot 14.

The weight of the roller is, for example, taken up by a radial thrust roller bearing 23.

The jacket heating of the vessel 1 can also be replaced by direct electrical heating. Generally speaking, the heat transfer to the roller 2 by way of the liquid disposed in the space 14 is sufficient.

A stuffing box 20 connected by way of a pipe 21 to the supply pipe 15 in order to ensure absolute vacuum tightness.

Figures 3 and 4 show a film evaporator corresponding to that of Figures 1 and 2, in which, however, the supply pipes 15 are connected to the channel 16 of the element 13 and the discharge pipe 17 is connected to another channel 22 of the same element 13. The roller is mounted in ball bearings 23 (Figure 3). Liquid entering through the supply pipe 15 is distributed in the wedge-shaped space 14 and entrained in thin layers on the revolving roller 2 and again brought into the space 14, which it leaves through the channel 22 by way of the pipe 17. This arrangement prevents liquid from the supply pipe 15 being able to pass directly into the discharging pipe 17 without having passed through the evaporation chamber 3.

Another modified construction is shown in Figures 5 and 6. In order to be able to carry out evaporation in different stages, i.e. at a different vacuum or different temperatures, it is necessary for the apparatus to be divided horizontally into at least two evaporation zones 24 and 25. The separation of one evaporation zone 24 from the other zone 25 is effected by an intermediate flange 26, this flange co-operating with the roller 2 to form a slot 27 which corresponds to the narrowest part of the wedge-shaped space 14. Due to the difference in pressure between the two stages, some liquid will pass through the slot 27, either in the downward or upward direction. This liquid is immediately returned into the channel 16 so that it is possible for the individual zones with the liquid to be distilled to be sealed off without separate sealing means. The liquid is supplied to the zones 24 and 25 by way of the pipes 28 and 29 respectively and is discharged through the pipes 30 and 31. The zones 24 and 25 have vacuum pipe connections 32 and 33.

Figure 7 shows in cross-section a construction in which the roller is hollow and is heated by a fixed radiator element 84. In this case, the wedge-shaped elements 13 have recesses 82, in which it is possible to arrange, for example, electric heaters or similar members for producing steam heating, the connections being arranged in the base. The hot portions of the apparatus are separated from a cold housing 34 and a cooling jacket 35 by means of insulation 83. The liquid to be distilled is supplied through a channel 46 and a discharge channel 47 is arranged in an opposite wedge-shaped section 48.

Figures 8 and 9 show, in vertical and transverse section respectively, an evaporator in which cooling surfaces 36 are arranged in the immediate vicinity of the surface of the roller 2. A cooling medium can flow through the cooling surfaces 36 and is supplied through pipes 37 and discharged through pipes 38. The cooling surfaces can be arranged within the free path length of the molecules which path depends on the vacuum maintained in the chambers 39 and 40. If the condensate is liquid, it can be collected in a collecting channel 41 at the bottom of the vessel, as shown in Figure 8, and discharged into a vacuum vessel 42. Solid products can be scraped off by means of a scraper 43 which is arranged on the roller 2 and can be collected in a collecting chamber 44 of the apparatus.

The apparatus described in the present specification can also be used for the evaporation (drying), distillation, rectification and evacuation of liquids.

A considerable degree of latitude is available as regards the viscosity of the liquid to be treated, since it is also possible to treat liquids having a low viscosity factor when using a high rotational speed of the roller of, for example 2800 r.p.m. and an extremely small slot width of about 0.05 mm. The higher the viscosity of the liquid which is to be treated, the easier will it be to construct and operate a complete apparatus.

I claim:
1. A film evaporator for liquids comprising an evaporator chamber, a roller which serves as an evaporator surface rotatably arranged within said chamber and adapted to be wetted by liquid disposed therein, an elongated surface element fixedly arranged in said chamber cooperating along a portion of its surface with the surface of said roller to form a vertical wedge-shaped slot-like space therebetween capable of retaining liquid therein said roller rotatable in a direction from the wider to the narrow end of said slotlike space, at least one elongated channel defined in said portion of the surface element extending from the upper to the lower portions of the wedge-shaped slot and communicating with said space, and inlet and outlet means by means of which the liquid can be uniformly supplied under pressure to said channel and can be discharged from said space by the pressure created therein during rotation of said roller.

2. A film evaporator according to claim 1, wherein the roller is provided with heating means.

3. A film evaporator according to claim 1, wherein said channel is an open channel arranged in the surface of said element axially of the roller, opening into the wedge-shaped space, the said channel being connected to said inlet and outlet means for the liquid.

4. A film evaporator according to claim 3, wherein said inlet means is connected to one channel and said outlet means is connected to another channel defined in said portion of the surface element.

5. A film evaporator according to claim 1, wherein a fixed partition is arranged in the evaporation chamber transversely of the roller which divides said chamber into two separate evaporation zones, said partition having an opening defined therewithin for the passage of the roller therethrough, the said opening being such that the width of an annular gap formed between the roller and the partition is substantially equal to the width of the wedge-shaped space at its narrowest point and means for transferring liquid from one said zone to the other whereby it is possible to carry out evaporation in different stages.

6. A film evaporator according to claim 1, wherein at least one cooling surface is arranged in juxta position to the surface of the roller.

7. A film evaporator according to claim 1, wherein at least one heating surface is arranged in juxta position to the surface of the roller.

8. A film evaporator according to claim 1 wherein the element is hollow and has inlet and outlet openings for heat transfer media.

References Cited in the file of this patent

UNITED STATES PATENTS

| | | |
|---|---|---|
| 765,343 | Just | July 19, 1904 |
| 1,420,648 | Mabee | June 27, 1922 |
| 1,576,471 | Rigby | Mar. 9, 1926 |
| 2,131,666 | McDougall | Sept. 27, 1938 |
| 2,418,313 | Morley | Apr. 1, 1947 |
| 2,546,381 | Zahm | Mar. 27, 1951 |
| 2,743,015 | Jansma | Apr. 24, 1956 |
| 2,782,843 | Rodenacker | Feb. 26, 1957 |
| 2,804,920 | Perkins | Sept. 3, 1957 |

FOREIGN PATENTS

| | | |
|---|---|---|
| 260,595 | Germany | June 4, 1913 |
| 60,105 | Austria | July 10, 1913 |
| 1,072,135 | France | Sept. 8, 1954 |